April 5, 1927.

G. W. WILLIAMS ET AL 1,623,293

SOLDERING MACHINE

Filed April 30, 1924

7 Sheets-Sheet 1

April 5, 1927.　　G. W. WILLIAMS ET AL　　1,623,293
SOLDERING MACHINE
Filed April 30, 1924　　7 Sheets-Sheet 3

Inventors
George W. Williams
Axel N. Walstrom
by Hewitt S. Dixon Atty

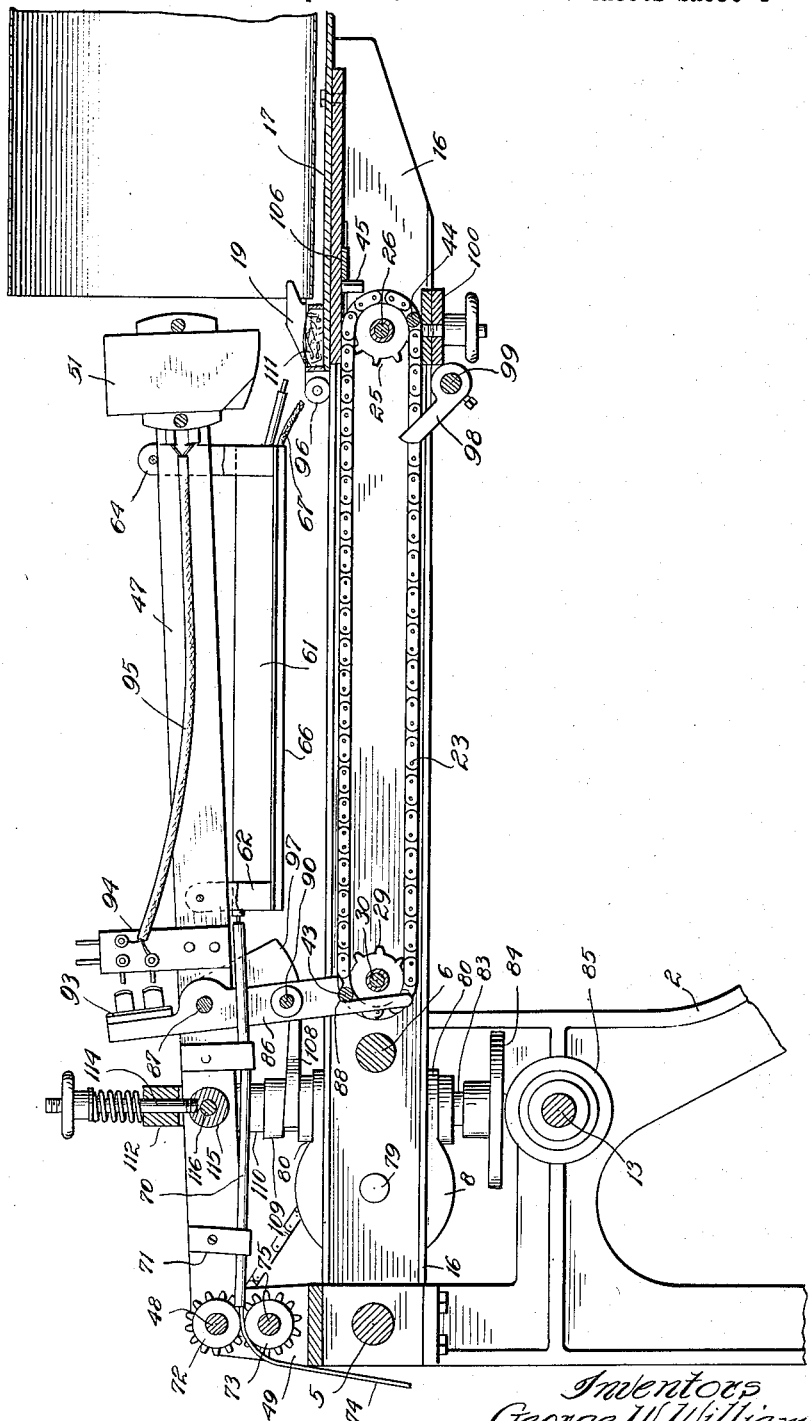

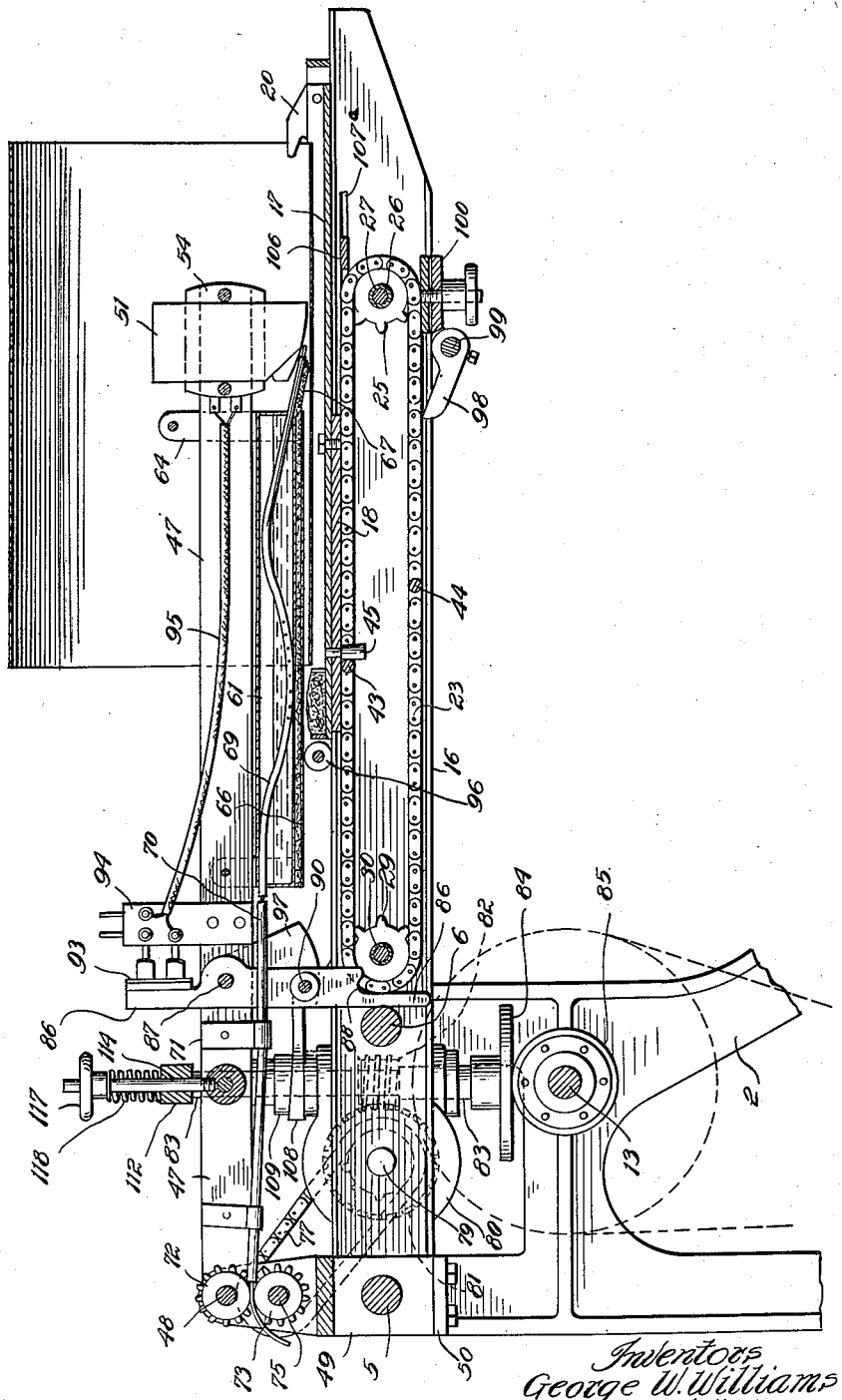

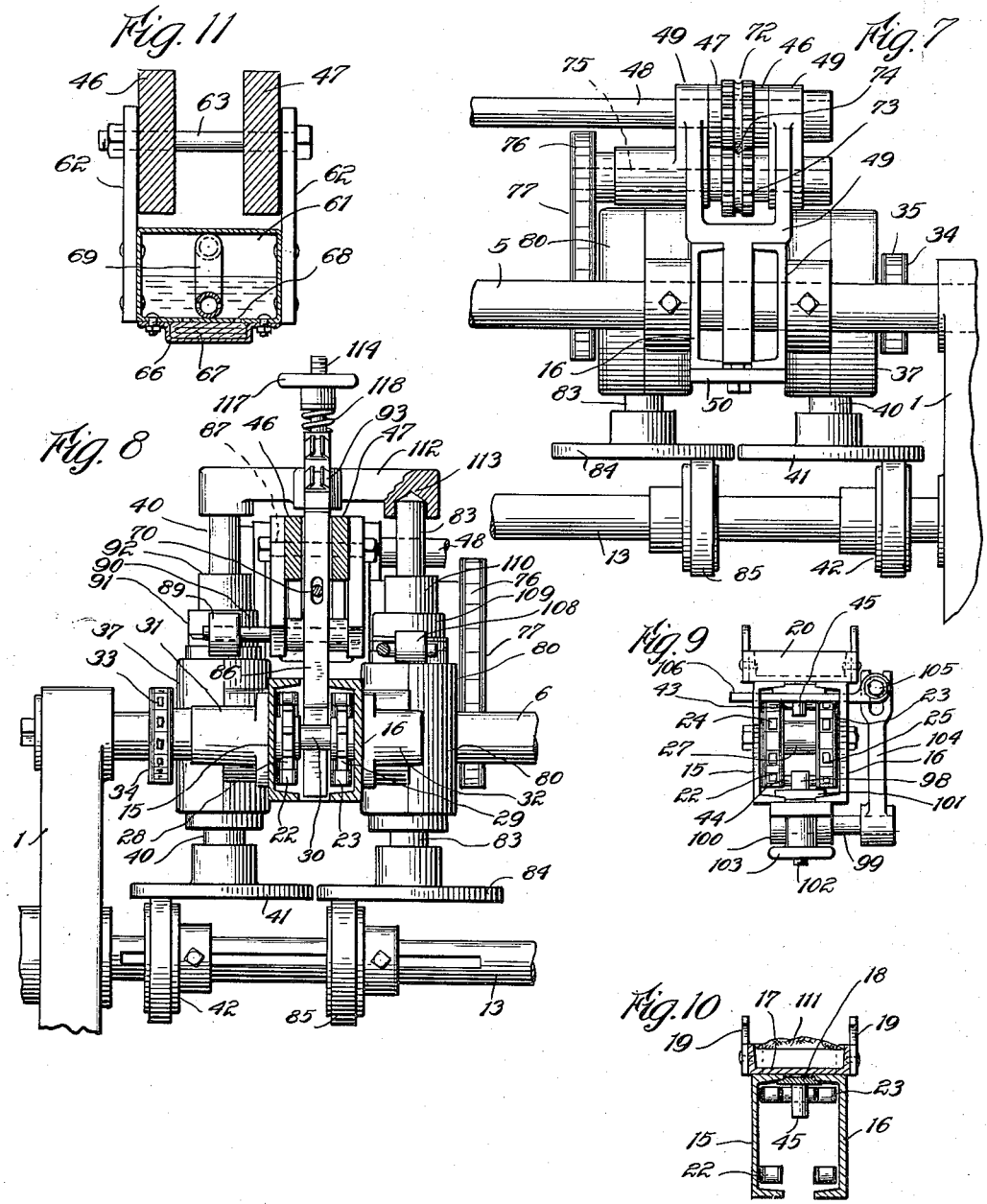

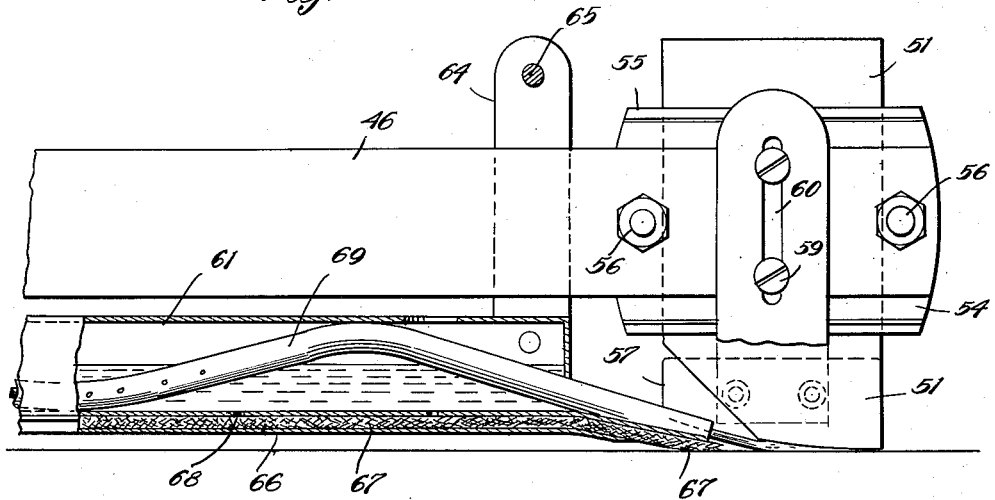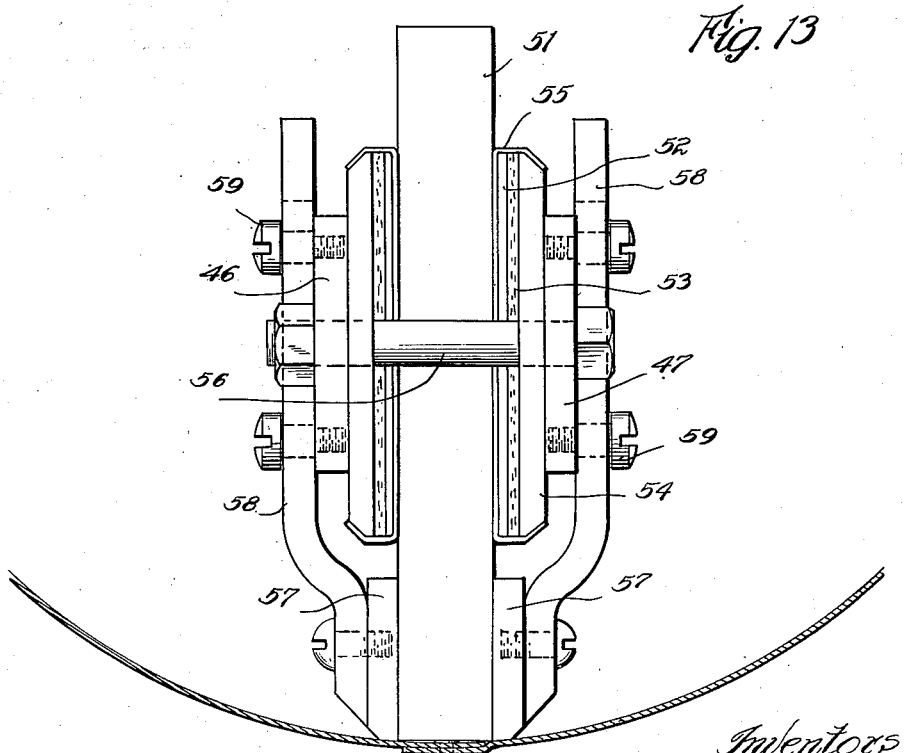

Patented Apr. 5, 1927.

1,623,293

UNITED STATES PATENT OFFICE.

GEORGE W. WILLIAMS, OF OAK PARK, ILLINOIS, AND AXEL M. WALSTROM, OF MINNEAPOLIS, MINNESOTA, ASSIGNORS TO THE CREAMERY PACKAGE MFG. COMPANY, OF CHICAGO, ILLINOIS, A CORPORATION OF ILLINOIS.

SOLDERING MACHINE.

Application filed April 30, 1924. Serial No. 710,004.

The invention relates to can soldering machines, more particularly to a machine for soldering the longitudinal or side body seams of sheet metal cans.

Cans used as containers for highly perishable foods, such as milk and its products, should be smoothly finished, especially inside, to permit of their thorough cleansing. Any interior crevices or pockets about the joints of the can structure will retain bacteria laden accumulations difficult to remove and dangerous to the fresh contents of the cans. It is the practice to strengthen and fill the riveted, folded or welded can seams by the application of a covering of solder, of necessity on the inside of the can and preferably on the outside also. Heretofore, such soldering has been done manually with indifferent results as to effectiveness and smoothness, except at the hands of the most skillful artisans, and with considerable addition to the cost of the can in labor and material.

It is the object of this invention to provide a machine for the automatic application of solder to either the inner or the outer side of the longitudinal joint between the lateral edges of a sheet of metal shaped to form the body portion of a can.

Further objects include the application of the solder in a uniform ribbon or band of smooth surface; the consumption of a minimum amount of solder to accomplish satisfactory results with consequent economy of material; and a considerable saving in the cost of manufacturing the cans.

Other objects and advantages will be apparent in the following detailed description of a preferred embodiment of the invention which we have selected for illustration in the accompanying drawings. It will be understood, however, that many changes in form, construction and arrangement may be made by one skilled in the art without departing from the spirit and scope of the invention as expressed in the appended claims.

Figure 1:
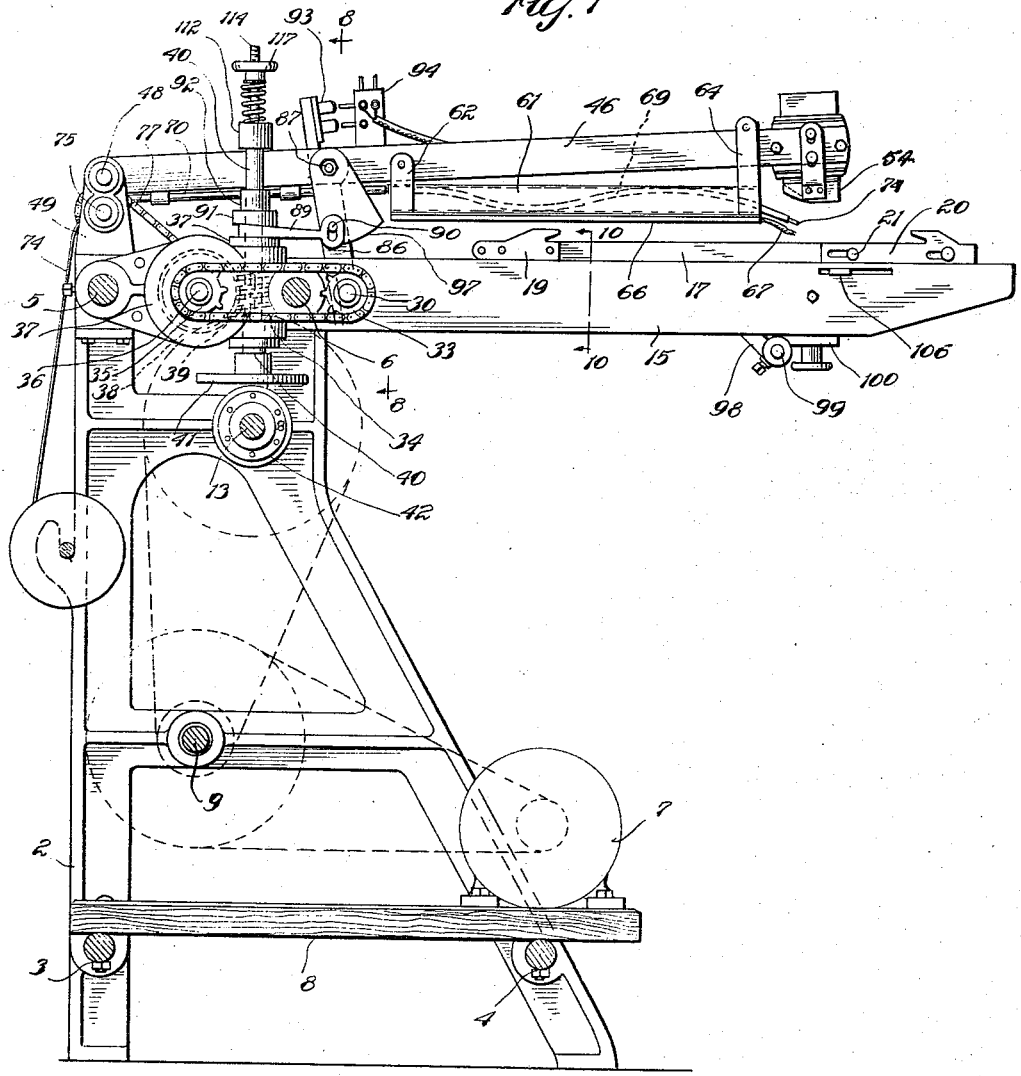
Figure 2:
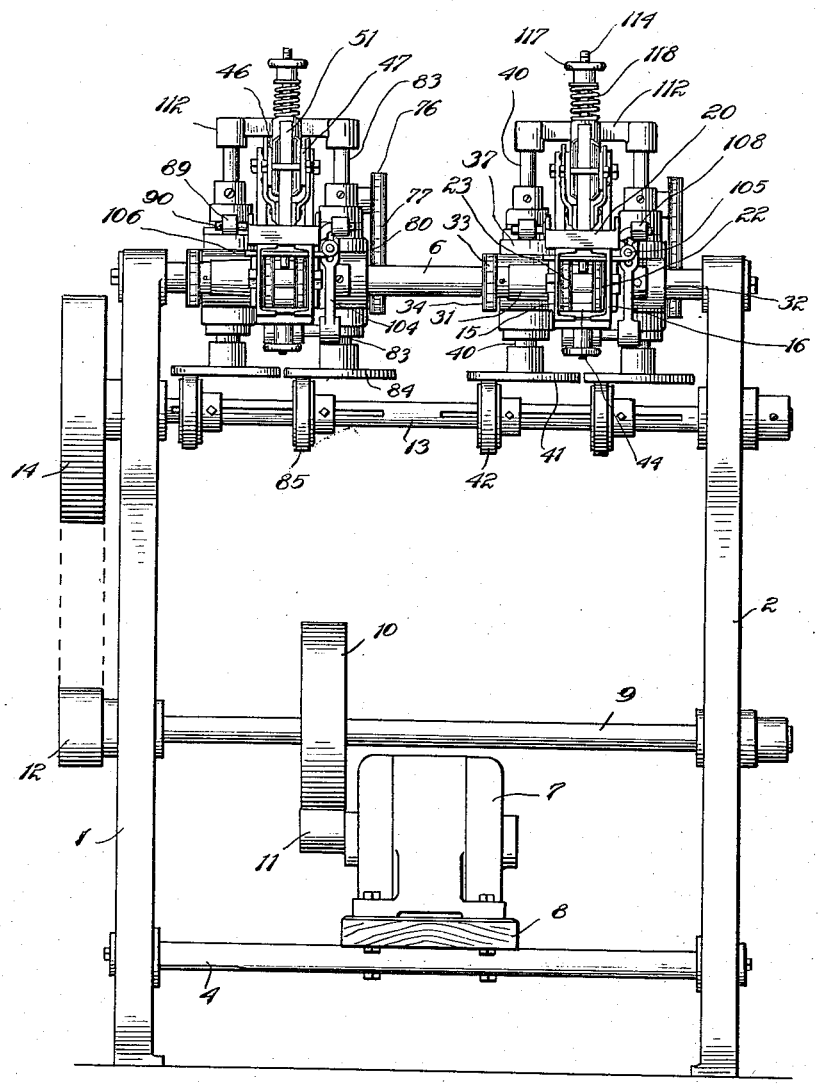
Figure 3:
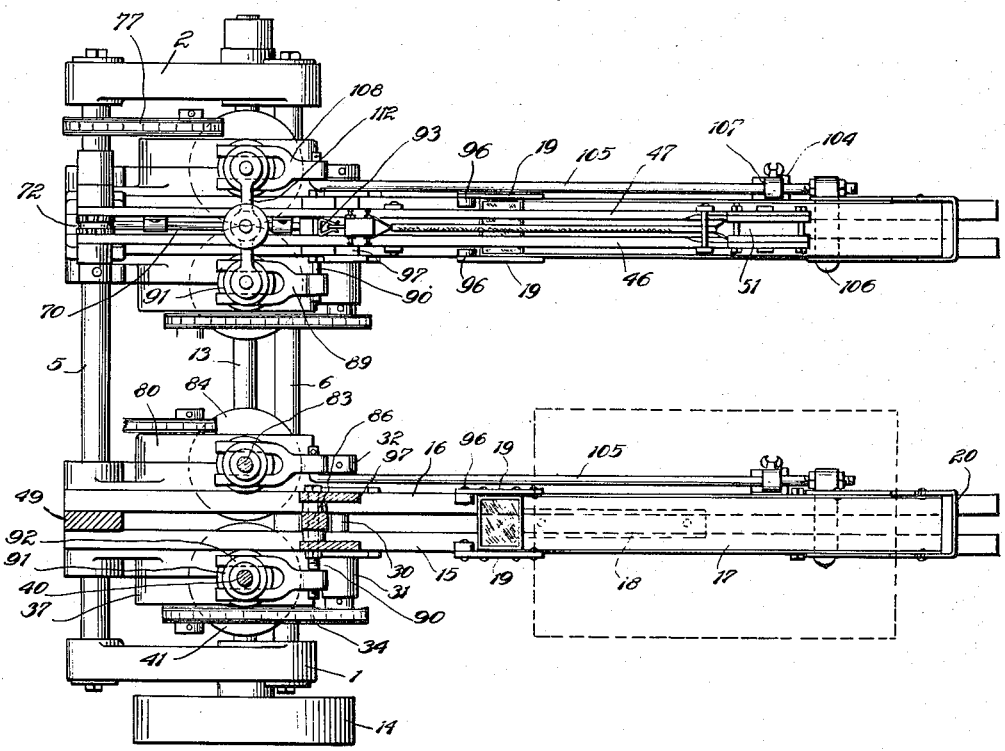
Figure 4:
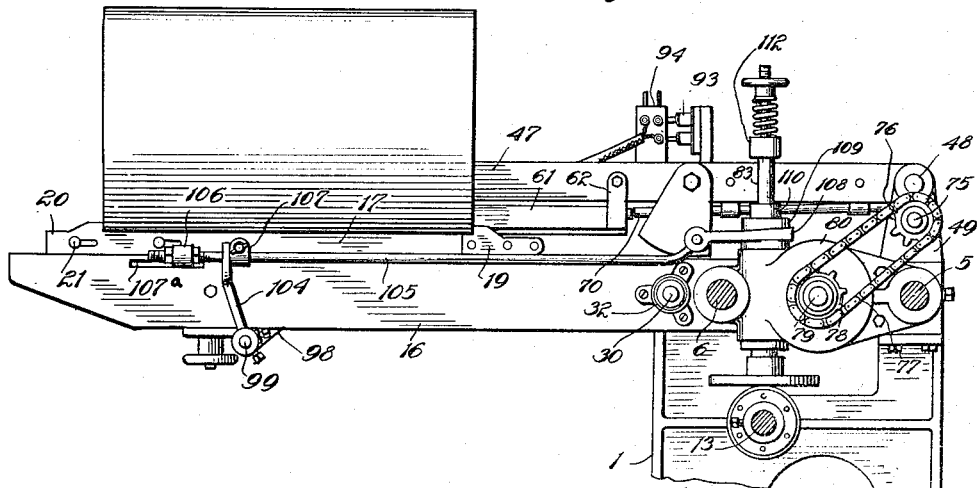

Referring to the drawings, Fig. 1 is an elevation of one side of the machine with the near side frame removed. Fig. 2 is a front end elevation. Fig. 3 is a plan view of the machine, partially in section. Fig. 4 is an elevation of the opposite side of the upper portion of the machine with the near side frame removed. Figs. 5 and 6 are center sectional elevations of one unit of the machine showing the parts in different stages of operation. Fig. 7 is a partial rear end elevation of one of the units. Fig. 8 is a cross sectional elevation of one of the units taken on the line 8—8 in Fig. 1. Fig. 9 is a detail front end view of one of the can supporting arms. Fig. 10 is a cross section of the mid portion of the can supporting arm, taken on the plane of the line 10—10 in Fig. 1. Fig. 11 is a cross section of the support for the soldering copper and flux box. Fig. 12 is a side view of the soldering copper and associated parts. Fig. 13 is a front view of the copper and its heating units.

Stated generally, the machine comprises a horizontally positioned stationary arm upon which is supported a travelling carriage adapted to receive and secure the can body to be soldered. Positioned above the stationary arm is a pivoted beam extending over the path of the carriage and supporting the soldering copper, the supply of flux, and an automatic device for feeding wire solder to the copper. The operator places a can body cylinder on the carriage in outward position, with the side seam beneath the copper, and with either the stationary arm or the copper supporting beam extending through the cylinder according to whether the outside or the inside of the seam is to be soldered. The carriage is then pushed rearwardly to the limit of its path, whereupon the heated copper is automatically lowered into contact with the seam, and operating mechanism is set in motion whereby the carriage is slowly moved forward carrying the seam along under the copper while solder and flux are automatically fed to the copper. At the end of the forward movement of the carriage, the solder feeding mechanism is stopped, the copper is wiped and elevated from the can, and the machine rests with the can body in position for removal and replacement by another. As illustrated herein, the machine comprises two soldering units of identical construction, enabling the operator to change the can bodies in one unit while the other is operating.

More specifically described, the operating parts of the machine are illustrated herein as being supported upon a frame comprising a pair of upright side members 1 and 2, rigidly connected by cross members 3, 4, 5 and 6. As here shown, a motor drive is provided comprising an electric motor 7 mounted on a plate 8 secured to the cross members 3 and 4. For speed reduction, a shaft 9 is journaled in the side members of the frame and carries a pulley 10 driven by suitable belting from the motor pulley 11, and a drive pulley 12. A main drive shaft 13 is journaled in the upper portions of the frame side members, and carries a pulley 14 driven from the pulley 12.

The two soldering units being similar in construction, the description of one will apply to both. Rigidly mounted on the frame members 5 and 6 are a pair of channel shaped bars 15 and 16 extending horizontally forward in parallel spaced relation with their flanges extending inwardly, and forming the main supporting arm for the movement of mechanism carrying the can body being operated upon. A slidable carriage is positioned on the bars 15 and 16 comprising a channel shaped body 17 longitudinally slidable on the upper flanges of the bars 15 and 16 and retained in its position thereon by a strap 18 (see Figs. 6 and 10) positioned beneath the upper flanges of the bars with a longitudinally arranged tongue extending upwardly between their flanges. The strap 18 is rigidly secured to the body member 17, the tongue portion serving as a guide for the longitudinal movement of the carriage on the bars 15 and 16. The carriage body 17 is provided at its rear end with a pair of laterally positioned upwardly extending plates 19 rigidly secured and each having a notch in its front face adapted to receive one end of a can body resting on the carriage member 17. At the front end of the member 17 is a U-shaped plate 20 extending along the opposite sides of the member 17 and slidably secured thereto by means of pins 21 mounted on the member 17 and extending through longitudinal slots in the lateral arms of the plate 20. Each arm of the plate 20 also has an upwardly extending portion with a notch in its rear face to engage the opposite end of a can, the latter being placed on the carriage in engagement with the rear notches in the plates 19 and secured in its position by sliding the U-shaped member 20 to engage its notches with the front end of the can.

The can holding carriage is designed to be pushed manually to its rearmost position, and then propelled forwardly by mechanical means. The latter comprises a pair of chain belts 22 and 23 operating in spaced parallel relation within the longitudinal space between the two bars 15 and 16. The chains 22 and 23 are operatively supported near the front ends of the bars upon a pair of idler sprockets 24 and 25 loosely mounted on a pin 26 secured to the bars 15 and 16 and carrying a spacer sleeve 27 between the sprockets. Rearwardly the chains are supported upon a pair of driving sprockets 28 and 29 rigidly mounted on a shaft 30 extending laterally through the bars 15 and 16 journaled in bearings 31 and 32 mounted thereon.

One end of the shaft 30 extends outwardly of the bearing 31 and carries a rigidly mounted sprocket 33 which is driven by a chain belt 34. The latter is driven by a sprocket 35 carried by a shaft 36 journaled in a casing 37 mounted adjacent the bar 15 on the cross members 5 and 6 of the frame, and bearing at the other end in the bar 15. Within the casing 37 the shaft 36 carries a worm gear 38 in driven engagement with a worm sleeve 39 splined on a vertical shaft 40 having its bearings in the casing 37 and extending above and below the latter, the shaft 40 being longitudinally slidable through its bearings and through the splined worm sleeve 39.

The lower end of the shaft 40 carries a rigidly mounted friction disc 41, normally in driven engagement with a friction wheel 42 keyed upon the drive shaft 13. The wheel 42 is preferably adjustable longitudinally on the shaft 13 so as to vary its distance from the axis of the disc 41 and thereby vary the speed of the driving train operating the chains 22 and 23. The disc 41 may be lifted out of engagement with the constantly driven wheel 42, as hereinafter described, to stop the operation of the chains.

The chains 22 and 23 are provided with a pair of cross connecting bars 43 and 44 spaced at equal intervals in the chains. A pin 45, rigidly secured in the sliding carriage members 17 and 18, depends into the path of the bars 43 and 44 and serves to move the carriage forward from its rearward position when engaged by either of the cross bears 43 or 44, the latter moving the carriage to foremost position and then passing down off the pin as the bars are carried around the front idler sprockets.

Positioned centrally above the carriage 17 and approximately parallel to its path of movement is a copper supporting beam comprising a pair of spaced bars 46 and 47. The latter bars are pivotally supported at their rear ends on a shaft 48 carried by the upwardly extending spaced arms of a yoke bracket 49 rigidly secured to the rear ends of the spaced carriage supporting bars 15 and 16, as by a bolted plate 50.

Between the front ends of the spaced bars 46 and 47 is supported a soldering copper 51 with a pair of laterally positioned heating units. As illustrated herein, the latter comprise an electric resistance element 52 (see Fig. 13) outwardly covered by an insulating sheet 53 in turn outwardly covered by a plate 54. A thin protective sheath 55 preferably is secured about the inner surface and edges of the heating unit. A pair of bolts 56 passing through the plates 54 and the bars 46 and 47 snugly secure the heating units to the copper 51 and support the latter from the beam bars.

The lower end of the copper, which is applied to the work, is flanked by a pair of vertically slidable plates 57, preferably of aluminum, which serve to define the margins of the band of solder, and are carried respectively by a pair of straps 58 slidably supported on the bars 46 and 47, as by a pair of screws 59 positioned in a vertical slot 60 formed in the respective straps.

A flux box 61 is suspended below the beam, being pivotally supported at its rear end by a pair of straps 62 secured to the box and pivoted on a bolt 63 carried by the bars 46 and 47. Another pair of straps 64 secured to the front end of the box extend upward laterally of the bars 46 and 47 and carry a connecting cross pin 65 positioned above the bars 46 and 47 and adapted to be engaged by the latter when the beam is raised to lift the flux box free of the work. A channeled wick holder 66 is secured beneath the flux box, the bottom of the latter being extended forward with the wick holder adjacent to the soldering copper. A wick 67 of suitable material is provided in the wick chamber beneath the flux box, and extending through the forward end of the holder where it is exposed and rests upon the work when the soldering copper is lowered, and wipes a supply of flux upon the can seam in advance of the application of the solder as the can is moved forward beneath the copper. A series of holes 68 through the bottom of the box supplies the liquid flux to the wick.

Wire solder is fed to the rear face of the soldering copper through a tube 69 extending longitudinally through and supported in the flux box 61, a portion of the tube within the box being curved downwardly beneath the level of the liquid flux and having holes therein to admit the flux to the submerged portion wherein the passing solder wire is subjected to a bath of flux. Another solder feed tube 70 rearwardly adjoins the tube 69 and is secured to one of the beam bars, as by straps 71. The tube 70 terminates adjacent a pair of preferably serrated solder feed rolls 72 and 73 from which the solder is propelled into and through the tubes 70 and 69 to the work, the solder wire being indicated as 74.

The upper feed roll 72 is positioned between the rear ends of the bars 46 and 47 and is idly rotatable on the supporting shaft 48. The lower roll 73 is rigidly mounted on a drive shaft 75 journaled in the arms of the yoke bracket 49 and extending outwardly at one side. The rolls 72 and 73 may be provided with interengaging teeth for positive operation of the idler roll, and both are provided with registering grooves, preferably serrated, which engage the wire solder between the rolls and indent the solder as it is propelled to the tubes, the indentations serving to assist in carrying flux with the solder to the hot copper.

The extended end of the shaft 75 carries a sprocket 76 driven by a chain 77 from a driving sprocket 78 mounted on a shaft 79 journaled in a casing 80 mounted adjacent the bar 16 on the cross members 5 and 6 of the frame. Within the casing 80 the shaft 79 carries a worm gear 81 (see Fig. 6) in driven engagement with a worm sleeve 82 splined on a vertical shaft 83 having its bearings in the casing 80 and extending above and below the latter, the shaft 83 being longitudinally slidable through its bearings and through the splined worm sleeve 82

The lower end of the shaft 83 carries a rigidly mounted friction disc 84, normally in driven engagement with a friction wheel 85 keyed upon the drive shaft 13. The wheel 85 is preferably adjustable longitudinally on the shaft 13 so as to vary its distance from the axis of the disc 84 and thereby vary the speed of the solder feed rolls 72 and 73. The disc 84 may be lifted out of engagement with the constantly driven wheel 85, as hereinafter described, to stop the operation of the feed rolls.

The soldering copper supporting beam is raised and lowered by mechanism comprising a bar 86 pivotally supported between the bars 46 and 47 on a cross bolt 87 extending through the latter bars. The lower end of the bar 86 extends between the rearward portions of the carriage-chain driving sprockets 28 and 29, in the path of the cross connecting members 43 and 44 carried by the chains 22 and 23. The front portion of the lower end of the bar 86 is cut away to form a slightly recessed shoulder 88 which is positioned for engagement by the respective cross bars 43 and 44 as they pass upwardly around the sprockets 28 and 29, thereby lifting the bar 86 and the copper supporting beam, the bar 86 being also swung forward with the circular movement of the cross bar about the sprockets. At the completion of the upward and forward movement of the bar 86, the chains 22 and 23 are automatically stopped while the cross bar is still engaged with the shoulder 88, and so rest maintaining the copper supporting beam in elevated position.

The stoppage of the chains 22 and 23 is accomplished by means of a link 89 (see Fig. 1) having a vertically slotted end pivotally engaging a pin 90 mounted in the bar 86, the opposite end of the link forming a yoke with tapered arms interposed between the upper face of the portion of the casing 37 forming the upper bearing for the shaft 40 and a tapered sleeve 91 loosely mounted on the shaft 40 with its lower portion shaped for sliding engagement between the yoke arms of the link 89. Bearing on the upper side of the sleeve 91 is a collar 92 fixed on the shaft 40. With the forward movement of the bar 86, the link 89 is drawn forward and its tapered yoke arms raise the sleeve 91, collar 92 and shaft 40, thereby lifting the driven friction disc 41 out of engagement with the driving wheel 42 and arresting the further movement of the driving train for the chains 22 and 23.

The bar 86 may be extended above its pivotal support and carry an electric switch 93 which operates in a well known manner to open and close an electric circuit, when the copper supporting beam is respectively raised and lowered, through a panel 94 mounted on the beam bars, and from which conductors 95 lead to the terminals of the heating elements 52 about the soldering copper, the panel 94 being provided with connections for conductors from a source of electric current. By this means the heating current may be cut off from the soldering copper when the latter is not in contact with the work, or the circuits to the two heating units may be arranged so that only one circuit is opened when the copper is lifted, the other being on closed circuit to maintain the copper at working temperature between operations.

The copper supporting beam is lowered from its elevated position and the carriage propelling chains put in motion by means controlled by the position of the carriage. The rear side plates 19 mounted on the carriage extend rearwardly, and each carries a pivoted roller 96 positioned over the bars 15 and 16 respectively. When the carriage is moved to rearmost position, the rollers 96 respectively engage the curved under sides of a pair of cams 97 also pivotally mounted on the cross bolt 87 in the copper supporting beam, and secured in rigid relation to the elevating bar 86 by the extension of the pin 90 through both cams with suitable spacer sleeves between the cams and bar 86. As the rollers are pushed under the cams 97, the beam and bar 86 are slightly raised thereby, relieving the latter from engagement with the cross bar 43. The rear end of the carriage member 17 then engages the bar 86 and moves the latter rearwardly to a stop against the frame member 6. The rearward movement of the bar 86 carries rearwardly the pin 90 and link 89, the latter thereby lowering the shaft 40 so that the friction disc 41 reengages the driving wheel 42, whereupon the upper runs of the chains 22 and 23 are again propelled forwardly, the cross bar 43 or 44 moving into engagement with the carriage pin 45 and propelling the carriage forward.

At the beginning of the movement of the chains the copper supporting beam is still in elevated position, being supported by the cams 97 resting upon the rollers 96. As the carriage moves forward the rollers 96 are gradually moved from under the curved faces of the cams, thereby gently lowering the beam and the soldering copper into contact with the work, the copper protruding somewhat in advance of the work at the beginning of the forward movement of the carriage.

The operation of the solder feeding rolls is so controlled that the solder is fed to the copper coincidently with its contact with the work. The feed rolls are set in motion by means of mechanism comprising a dog 98 positioned between the lower edges of the carriage supporting bars 15 and 16, its free end extending upwardly into the path of the cross bars 43 and 44 carried by the carriage propelling chains. The dog 98 is rigidly mounted on a rock-shaft 99 journalled in a bracket 100 adjustably secured to the under side of the bars 15 and 16, as by an inner plate 101 (see Fig. 9) positioned above the lower flanges of the bars and carrying a bolt 102 passing through the bracket and receiving a lock nut 103.

One extended end of the rock shaft 99 carries a rigidly mounted arm 104 having a divided upper end embracing a rod 105 (see Fig. 4) extending longitudinally of the bar 16. The forward end of the rod 105 is carried by a cross bar 106 slidably positioned in slots 107ª in the lateral walls of the bars 15 and 16 just forward of the chain carrying sprockets 24 and 25, the bar 106 traversing the path of the depending carriage pin 45. The position of the bar 106 on the rod 105 is preferably adjustable. An adjustable collar 107 is mounted on the rod 105 rearward of the embracing end of the arm 104 and adapted for engagement by the latter.

The rear end of the rod 105 is operatively connected to a link 108 having tapered yoke arms interposed between the upper face of the portion of the casing 80 forming the upper bearing for the shaft 83 and a tapered sleeve 109 loosely mounted on the shaft 83 and with its lower portion shaped for sliding engagement between the yoke arms of the link 108. Bearing on the upper side of the sleeve 109 is a collar 110 fixed on the shaft 83.

Referring to the positions of the chain cross members 43 and 44 illustrated in Fig. 5, the return to rearmost position of the work supporting carriage puts in motion the chains 22 and 23, whereupon the cross member 44 is carried rearwardly by the return run of the chains and engages the dog 98 coincidently with the lowering of the soldering copper to the work. By such engagement the arm 104 is swung rearwardly against the collar 107, moving the rod 105 and the link 108 rearwardly, the latter thereby lowering the sleeve 109, collar 110 and the shaft 83, and dropping the friction disc 84 into engagement with the driving wheel 85 whereby the driving mechanism for the solder feed rolls is put in motion.

The feed roll mechanism is stopped as the soldering copper approaches the end of the can seam and before the work carriage reaches its foremost position, by engagement of the depending pin 45 with the sliding bar 106 whereby the rod 105 is drawn forward with the tapered link 108, the forward movement of the latter effecting the lifting of the shaft 83 and disengaging the disc 84 from its driving wheel 85, at the same time repositioning the dog 98. The continued forward movement of the carriage effects a finish wiping of the soldering copper by drawing beneath its working face a pad 111 of suitable material positioned at the rear end of the carriage where the copper passes from the work across the pad. The copper and its supporting beam are then elevated by means previously described.

The weight of the beam and parts supported thereon is partially counterbalanced and utilized to maintain a positive driving friction between the discs 41 and 84 and their respective driving wheels, by means of a bridge 112 having end recesses 113 (see Fig. 8) loosely receiving the upper ends of the shafts 40 and 83 and resting thereon.

Positioned centrally of the bridge 112 is an upright pin 114 passing loosely through the bridge and secured at its lower end in a collar 115 positioned between the beam bars 46 and 47 and secured thereto by a bolt 116. The upper end of the pin 114 carries a threaded adjustable nut 117 between which and the bridge 112 is confined a compression spring 118. By this means a part of the weight of the beam is resiliently supported upon the shafts 40 and 83, assuring positive driving engagement of the discs with their under positioned wheels when the discs are in lowered position.

In operation, an attendant places a can body cylinder on the work carriage with its seam underlying the soldering copper and in engagement at its rear end with the notches in the plates 19. He then closes the front strap 20 in engagement with the front end of the can and pushes the carriage to rearmost position. The carriage forwarding mechanism is automatically started in operation as described, the soldering copper is lowered, and the can progresses forward. The seam to be soldered receives first a wiped bath of flux, then the solder melted from the advancing wire fed in just the required quantity, followed by the finishing contact of the hot copper which smoothly spreads the solder within the straight margins defined by the laterally bearing plates. At the finish of the seam, the copper is wiped and elevated from the work, the solder feed is stopped, and the carriage is advanced to a position where the can body is readily removable by the withdrawal of the strap 20, the operating parts of the machine meanwhile coming to rest until the work carriage is again pushed to rearmost position.

We claim as our invention:

1. A soldering machine comprising a reciprocatory carriage for a can body having a side seam, a heated soldering copper, a swinging arm supporting said copper adjacent the path of said seam, means for forwarding said carriage, and means operable by the movement of said carriage to rearward position to cause the actuation of said carriage forwarding means and to move said swinging arm to effect contact by said copper with said can seam.

2. A soldering machine comprising a reciprocatory carriage for a can body having a side seam, a heated soldering copper, a swinging arm supporting said copper adjacent the path of said seam, means for forwarding said carriage, and means operable by the movement of said carriage to rearward position to cause the actuation of said carriage forwarding means and to move said swinging arm to effect contact by said copper with said can seam, said last mentioned means being operable to move said swinging arm with said copper away from said seam and to arrest the actuation of said carriage forwarding means when said carriage has reached its forward position.

3. A soldering machine comprising a reciprocatory carriage for a can body having a side seam, means for forwarding said carriage, a heated soldering copper, means for moving said copper into sliding contact with said seam during the forward movement of said carriage, means for feeding solder to said copper, and means operable by said carriage forwarding means to cause the actuation of said solder feeding means during the period of contact by said copper with said seam.

4. A soldering machine comprising a reciprocatory carriage for a can body having a side seam, means for forwarding said carriage, a heated soldering copper, means for moving said copper into contact with said seam during the forward movement of said carriage, means for feeding solder to said copper, and means operable by said carriage forwarding means to start the operation of said solder feeding means when said copper contacts said seam and to stop the operation of said solder feeding means when said seam passes out of contact with said copper.

5. A soldering machine comprising a reciprocatory carriage adapted to receive a can body having a side seam, a heated soldering copper, a swingable arm supporting said copper adjacent the path of said carriage, a belt having spaced members severally adapted to engage and move said carriage forwardly, actuating means for said belt, and means connected with said swingable arm and said belt actuating means operable by the movement of said carriage into rearward position to start the operation of said actuating means and to swing said copper into contact with said can seam, said last mentioned means being operable by said belt members to swing said copper away from said can seam and stop the operation of said actuating means when said carriage has reached its forward position.

6. A soldering machine comprising a reciprocatory carriage adapted to receive a can body having a side seam, a soldering copper, means for moving said copper into contact with said can seam during the movement of said carriage, means for feeding solder to said copper, a belt having a run positioned adjacent the path of said carriage, spaced members on said belt adapted to engage said carriage and move it forwardly, means operable by said members to start the operation of said solder feeding means following the beginning of the movement of said carriage, said last mentioned means being operable by said carriage at its forward position to stop the operation of said solder feeding means.

7. In a soldering machine, a slidable carriage adapted to receive a can body to be soldered, a belt having a plurality of spaced members adapted to engage said carriage and slide it in one direction, a movable bar operatively supported in the path of said members and engageable thereby, driving means for said belt, means connected with said movable bar for starting and stopping said driving means, said movable bar being operable by said carriage in the movement of said carriage to one end of its path to start said belt driving means, and operable by one of said members to stop said belt driving means when said carriage has been propelled to the opposite end of its path, and means for applying solder to said can body during the movement of said carriage.

8. In a soldering machine, a stationary support, a carriage slidable on said support adapted to receive a can to be soldered, a movable support positioned over said stationary support and carrying a soldering copper positioned for contact with said can, a belt operatively positioned adjacent the path of said carriage, spaced members on said belt adapted to engage said carriage and slide the same along said stationary support, and a bar pivoted on said movable support extending into the path of said members, said bar being operable by the engagement of either of said members to lift said movable support and move said copper free from said can, and operable by said carriage at one end of its path of movement to release said movable support and lower said copper into contact with said can.

9. In a soldering machine, a stationary support, a carriage slidable on said support adapted to receive a can to be soldered, a movable support positioned over said stationary support carrying a soldering copper positioned for contact with said can, a belt operatively positioned adjacent the path of said carriage, spaced members on said belt adapted to engage said carriage and slide the same along said stationary support, a bar pivoted on said movable support, extending into the path of said members, and driving means for said belt having a connection with said bar for starting and stopping said driving means, said bar being operable by engagement of one of said members to lift said movable support and said copper free from said can and stop said driving means, and operably by said carriage at one end of its path of movement to lower said movable support and said copper into contact with said can and start said driving means.

10. In a can soldering machine, a stationary support, a carriage slidably mounted on said support, adapted to carry a can to be soldered, an intermittently operable belt operatively mounted on said support, a plurality of members carried by said belt severally adapted to operatively engage said carriage and move the same forwardly, said members being positioned when said belt is at rest to permit the free rearward movement of said carriage, and means for applying solder to said can during the forward movement of said carriage.

11. In a can soldering machine, a reciprocatory carrage adapted to carry a can to be soldered, a belt adapted to move said carriage forwardly, actuating mechanism for said belt including a constantly driven element and a movable element adapted for selective engagement therewith, a movable bar having operative connection with said movable element, said bar being operable by the rearward movement of said carriage to move said movable element into engagement with said driven element, a member on said belt adapted to operatively engage said bar and move said movable element out of engagement with said driven element, and means for applying solder to said can during the forward movement of said carriage.

12. In a can soldering machine, a stationary support, a reciprocatory carriage slidably mounted thereon and adapted to receive a can body, a pivoted arm positioned above said support and carrying a soldering copper adjacent the path of said carriage, a bar pivoted on said arm and depending into the path of said carriage, a plate mounted on said arm having an upwardly inclined under surface extending toward said carriage, and means for elevating and supporting said bar to maintain said arm and copper in elevated position, said carriage being movable into engagement with said bar to release it from said elevating and supporting means whereby said plate rests upon said carriage and gradually lowers said arm and copper with the forward movement of said carriage.

13. In a can soldering machine, a slidable carriage adapted to receive a can body to be soldered, a soldering copper, electric means for heating said copper having current conductors, a switch controlling the circuit through said conductors, a pivoted arm supporting said copper, and a bar pivoted on said arm and operatively associated with said switch, said bar being operable to move said arm to swing said copper into contact with said can body and simultaneously close said circuit through said switch, and to remove said arm and copper from said can body and open said circuit.

14. In a can soldering machine, a slidable carriage adapted to move a can body to be soldered, a heated copper, a swingable arm supporting said copper and operable to move said copper into and out of contact with said can body, means for actuating said carriage and said arm including a belt having spaced projecting members, a pair of solder feed rolls adapted to feed solder to said copper, actuating mechanism for said rolls including a constantly driven element and a movable element adapted for selective engagement therewith, a lever having operative connection with said movable element and operable by a member on said belt to cause the engagement of said movable member when said copper is in contact with said can body, and a bar having operative connection with said movable element operable by said carriage to cause the disengagement of said movable member as the rear end of said can body approaches said copper.

15. In a can soldering machine, a reciprocatory carriage for holding a can body to be soldered, a vertically swingable arm carrying a soldering copper movable into contact with said can body, means for feeding solder to said copper, actuating mechanism for said carriage and said arm having a longitudinally movable vertical shaft, actuating mechanism for said solder feeding means having a longitudinally movable vertical shaft, said shafts being positioned on laterally opposite sides of said arm, a driven element on the lower end of each of said shafts, driving elements positioned respectively for engagement by said driven elements, a cross member loosely bearing on the upper ends of said shafts, and a resilient connection between said arm and said cross members partially supporting said arm.

16. In a can soldering machine, a reciprocatory carriage for holding a can body to be soldered, a vertically swingable arm carrying a soldering copper movable into contact with said can body, means for feeding solder to said copper, intermittently operable actuating mechanism for said carriage and said arm having a longitudinally movable vertical shaft, intermittently operable actuating mechanism for said solder feeding means having a longitudinally movable vertical shaft, said shafts being positioned on laterally opposite sides of said arm, a driven element on the lower end of each of said shafts, driving elements positioned respectively for engagement by said driven elements, a cross member loosely bearing on the upper ends of said shafts, a resilient connection between said arm and said cross members partially supporting said arm, and means for selectively raising said shafts to disengage said driven elements.

17. In a can soldering machine, a heated soldering copper, means for moving a can body to be soldered in sliding contact with said copper, means for feeding solder to the contacting face of said copper, and a pair of loosely mounted plates positioned on opposite lateral sides of the can contacting portion of said copper and extending into contact with said can body, said plates being of material to which the solder is non-adherent.

18. In a can soldering machine, means for moving a can body to be soldered, a soldering copper, a pair of electric heating units positioned on opposite sides of said copper having current conductors leading thereto, a movable arm supporting said copper and heating units for movement of said copper into and out of contact with said can body, and means associated with said arm for controlling the current circuit to one of said heating units operable to close said circuit when said copper is in position for contact with said can body and to open said circuit when said copper is out of contact position.

In witness whereof we have hereunto attached our signatures.

GEORGE W. WILLIAMS.
AXEL M. WALSTROM.